May 12, 1959     H. T. DYBVIG ET AL     2,886,711
DOSIMETER FOR DETECTING AND EVALUATING IONIZING RADIATION
Filed May 17, 1955     3 Sheets-Sheet 3
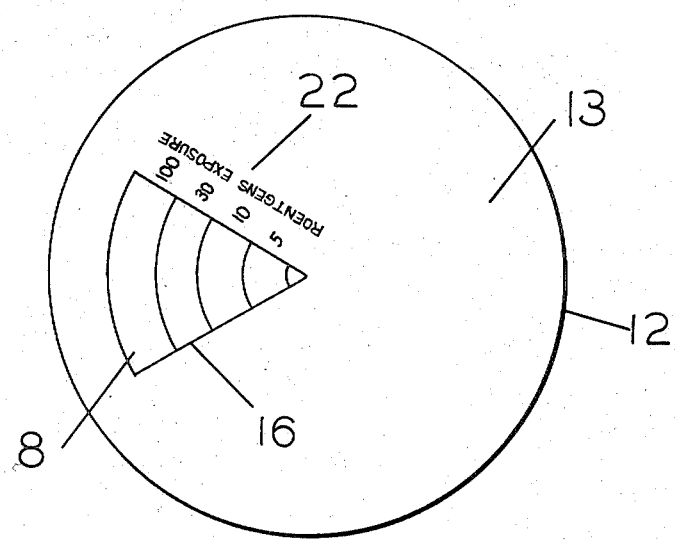
FIG VIII
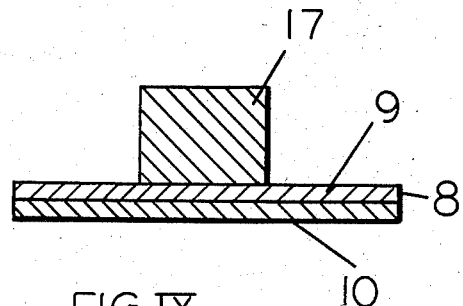
FIG IX
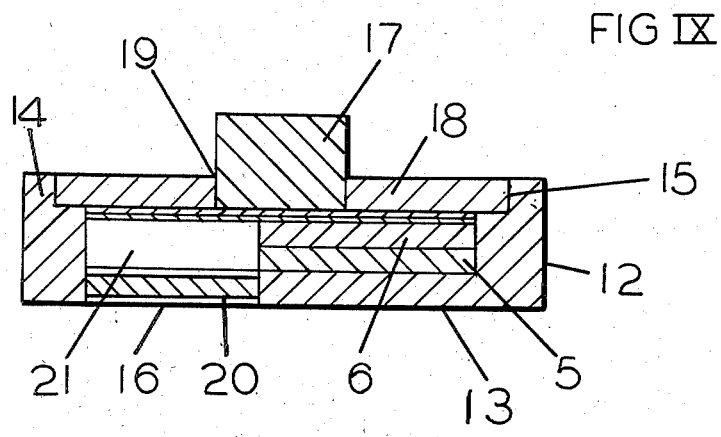
FIG VII
INVENTORS
H. TALMAN DYBVIG
JOSEPH E. DUFFY
BY
ATTORNEYS

United States Patent Office 2,886,711
Patented May 12, 1959

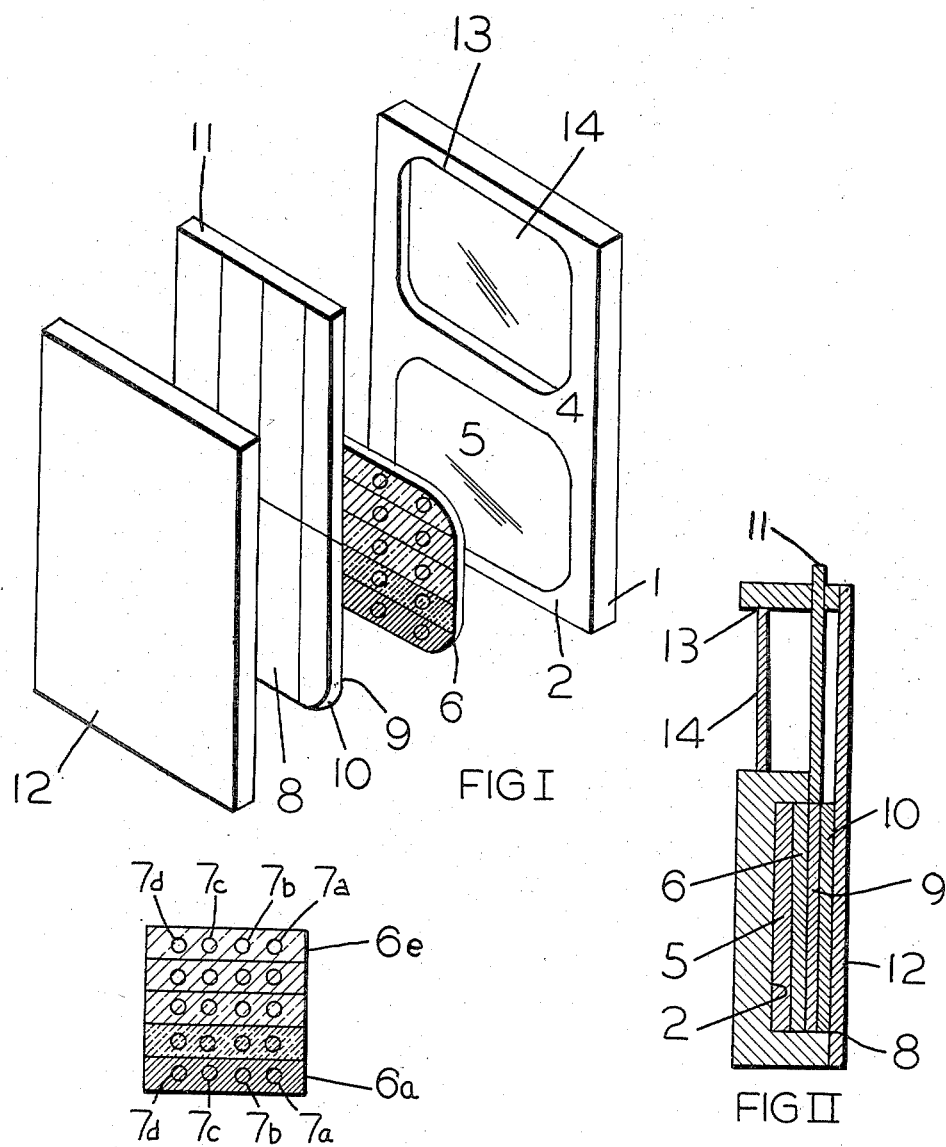

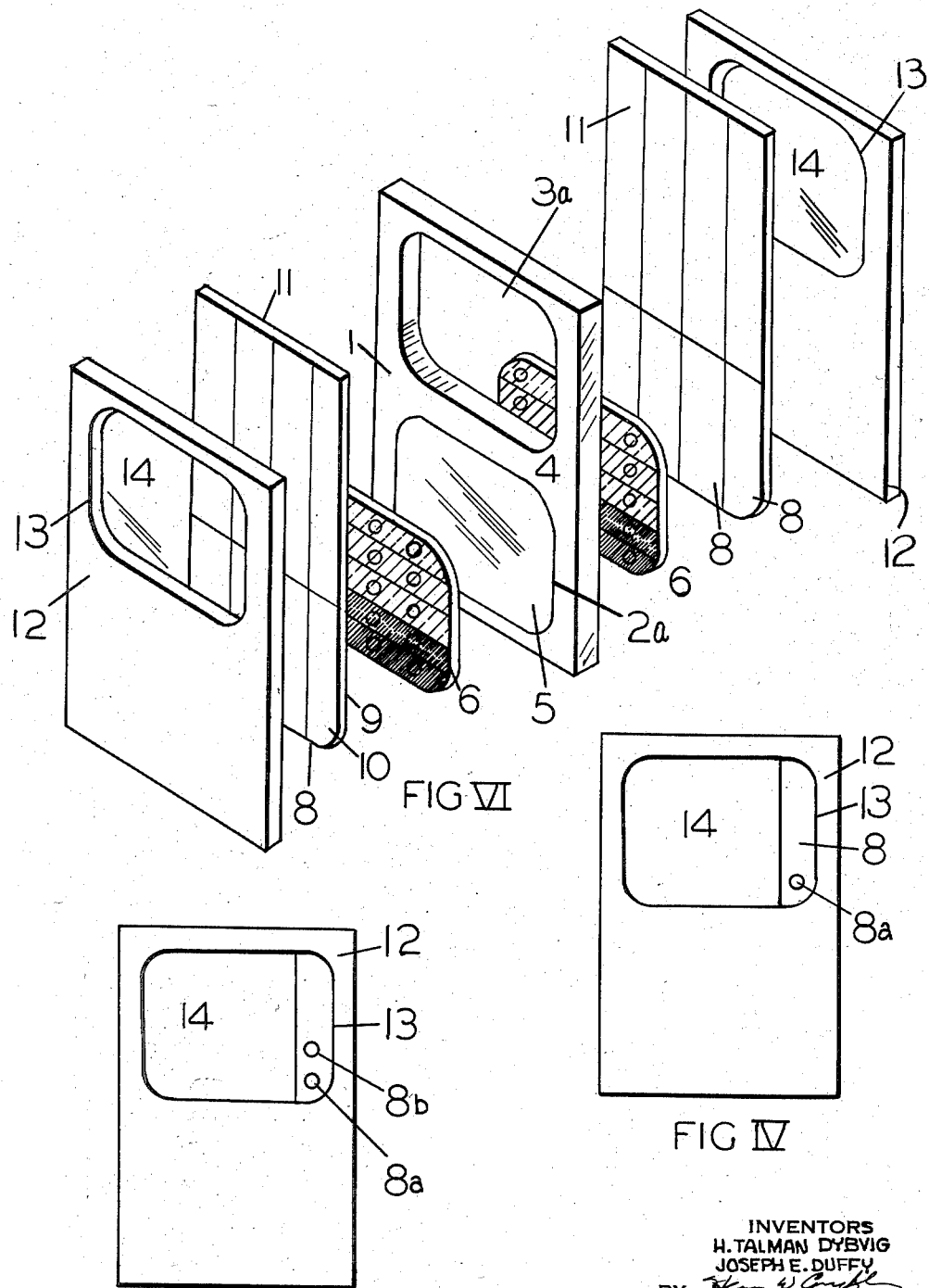

2,886,711

DOSIMETER FOR DETECTING AND EVALUATING IONIZING RADIATION

Henry T. Dybvig and Joseph E. Duffy, Binghamton, N.Y., assignors to General Aniline & Film Corporation, New York, N.Y., a corporation of Delaware Application May 17, 1955, Serial No. 508,998

5 Claims. (Cl. 250—65)

The present invention relates to an apparatus for detecting the presence of ionizing radiation and, more particularly, to such apparatus which enables the immediate photographic detection of such radiation and a prompt evaluation of the approximate strength of the same.

The development of methods leading to the fission of the atom has made it imperative that persons subject to ionizing radiation engendered in such work be provided with means for readily indicating the presence and quantity of such radiation. Various devices called monitoring badges, dosimeters and the like have been constructed to meet this need. While many of these have proven to be of value, none partake of all optimum characteristics, to wit, rapid detection and a speed evaluation of the quantity of the radiation, i.e., dosage involved, detection of such dosage by mere visual inspection of the device, and re-use of the device without opening and reloading.

It has now been ascertained that these prerequisites are supplied in a fully enclosed dosimeter containing, as its essential elements, a casing or carrier being a gamma ray intensifier, a modulating wedge of varying densities calibrated for certain radiation dosages, cooperating with the gamma ray intensifier, and a light sensitive photographic element adjacent such modulating wedge provided with a high-speed, print-out emulsion on which the images of the wedge may be recorded without a developing operation, said images being viewable through the casing. With the dosimeter, a quantitative dosage in roentgens can be obtained when the wavelength of the ionizing radiation is known.

Such apparatus constitutes the purpose and object of the present invention.

Our invention is further illustrated in the accompanying drawings in which Figure I is an exploded diagram showing in perspective the essential elements of one embodiment of our invention;

Figure II is a vertical section of the assembled dosimeter;

Figure III is a plan view of a modulating wedge;

Figures IV and V are plan views of the photographic element in viewing position, showing the results of exposure to rays of varying intensity;

Figure VI is a diagram similar to that of Figure I but of a different embodiment of the invention;

Figure VII is a sectional view of still another modification of the invention;

Figure VIII is a bottom plan view of the last named modification; and

Figure IX is a vertical section through the light sensitive element.

Referring now to the drawings and, particularly to Figures I and II thereof, numeral 1 indicates a casing provided at opposite ends with recesses 2 and 3 separated by partition 4. A gamma ray intensifier screen 5 of conventional design, such as that of the thallium activated potassium iodide or silver activated zinc sulfide type, is located in the recess 2. A modulating wedge 6 of a shape and size conforming to the recess 2 is provided for seating over and in contact with screen 5. As will be seen from Figure III, said modulating wedge has five steps of increasing densities indicated by reference numerals 6a to 6e, respectively. Each step has printed thereon a row of opaque, doughnut-shaped characters 7a to 7e, respectively. The purpose of each row will be developed in greater detail hereafter.

Strips 8 of photographic light sensitive material are arranged so that the emulsion side thereof closely contacts the modulating wedge when the dosimeter parts are assembled. The drawing indicates the presence of four of such light sensitive strips. Each strip is designed to co-act with a row of opaque, doughnut-shaped characters on the modulating wedge and, hence, there will be four rows on said wedge, each covered by a strip of light sensitive material.

The photographic elements which constitute a very important part of the invention comprise a base 9 provided with a high-speed, print-out emulsion 10, the chief characteristic of which is the presence therein, with the light sensitive silver halide, of a content of silver citrate having the ability to convert the latent silver image produced on exposure to a silver image. A visual image is thus obtained without resorting to a wet developing step as in usual practice.

A suitable print-out emulsion for our purposes may be prepared as follows:

*Part I*

| | | |
|---|---|---|
| Potassium bromide | grams | 16.25 |
| Sodium chloride | do | 6.675 |
| Gelatin | do | 22.5 |
| Water to make | cc | 187.5 |

*Part II*

| | | |
|---|---|---|
| Silver nitrate | grams | 37.5 |
| Ammonium hydroxide (Sp. Gr. 0.91) | cc | 33.0 |
| Nitric acid (10%) | cc | 3.0 |
| Water to make | cc | 37.5 |

Part II is added to Part I at 55° C. After a period of 20 minutes, the mixture is chilled, shredded and washed for 30 minutes.

The product thus obtained is remelted and there is then added to 313 grams of the above, two solutions compounded as follows:

(1) 6.25 grams of citric acid dissolved in water to make 20 cc.;

(2) 12.5 grams of silver nitrate dissolved in 12.5 grams of water.

The resulting mixture is held at 32° C. with no agitation and, after a period of say 1½ hours, is coated on base 9.

Such emulsion is the subject of application, Serial No. 509,111 filed on even date by Thomas R. Thompson et al. and entitled, "High-Speed Print-Out Emulsion."

Each light sensitive photographic element 8 is attached through its base 9 to a transparent plastic leader 11, such as cellophane or the like. The leaders project beyond the top of casing 1, permitting each to be grasped to provide for manual elevation of the individual film strips from recess 2 for viewing at window 13.

The window opening 13 in casing 1 contains an orange filter 14 for viewing in subdued light the emulsion side of the photographic elements when elevated to the position of window 13, the casing 1 being closed by means of a back plate 12.

The involved dosimeter is to be carried on the person and manifestly should be made of a material of as light a weight as possible. To this end, the casing 1, back plate 12 and the like are constructed of a self-sustaining material permeable to gamma rays, such as a plastic, i.e., polymethylmethacrylate, polystyrene or the like, a metal such as aluminum or magnesium, wood, cardboard or the like. The selection of any specific material from this group is a matter for the skilled mechanic.

The dosimeter is assembled by locating the modulating wedge 6 in contact with the screen 5, disposing the photographic elements 8 in contact with the modulating wedge and closing the casing through application of plate 12. The latter may be fastened to the casing by any means (not shown) ensuring a light-tight seal. When thus assembled, the dosimeter is ready for use and will function in the following manner.

Ionizing radiation upon striking the dosimeter is converted into UV light energy in the intensifier screen 5. This energy acts upon the photographic elements 8, after passage through the modulating wedge 6, and exposes these elements in conformity with the pattern of the wedge. If the intensity of the radiation (UV light) is substantial, one or more of the characters 7a to 7d on the modulating wedge 6 will become visible as white dots 8a to 8d on the photographic elements, it being evident that the greater the intensity, the greater number of white dots.

The extent to which a photographic element 8 has been exposed (white dots visible) may be readily ascertained by elevating a given film strip through its attached leader 11 to viewing position through window 13 and filter 14. This dosage evaluation by viewing should be accomplished in subdued light so as to eliminate possible exposure by visible light rays.

In performing such a dosage evaluation, it is essential to know immediately whether or not any doughnut-shaped characters are visible, since this, in most cases, will be a criterion as to whether the rays are present in a lethal quantity. If only the first step 6a of the step wedge 6 be visible, the image on the photosensitive strip would consist of one doughnut-shaped character as in Figure IV; if the second step 6b also be visible, the image on said photosensitive strip would consist of two doughnut-shaped characters as in Figure V, etc.

If there be no image visible by direct reading in subdued light, the image may be intensified, say approximately one hundred times by post-exposing to a strong light source the photosensitive element 8 while under the orange filter 14. This source could be, for example, a 500 watt reflector flood lamp but if desired bright sunlight may be used to give sufficient irradiation. Daylight on a cloudy day requires long post-exposure (about 10 minutes) and gives results which are approximately one step low. About 60 seconds are required for the post-exposure with the 500 watt lamp at a distance of one foot.

If sufficient ionizing radiation were received by the dosimeter, the characters of the modulating wedge, upon post-exposure, come into view on the photosensitive element one after the other in the order starting with step 6a. A post-exposure is complete when the doughnut-shaped characters begin to fade out or, if no such characters appear, when the photosensitive paper becomes a dark brown color under the filter. It is imperative that the image be carefully watched during post-exposure since the time between the appearance of the doughnut-shaped characters, corresponding to the highest visible step, and the subsequent disappearance of these characters due to overexposure involves only a few seconds. The characters fade from view as post-exposure is continued, in the reverse order in which they appear. The post-exposure dosimeter gamma exposure is evaluated by noting the highest step which became visible and referring the same to a calibration chart for the exposure in roentgens.

A typical calibration chart for our dosimeter utilizing a thallium activated potassium iodide screen is as follows:

| With KI/Tl Screens | Direct Reading (Roentgens) | Post-Exposed Reading (Roentgens) |
| --- | --- | --- |
| First step visible | 90–250 | 0.9–2 |
| First two steps visible | 250–500 | 2–4 |
| First three steps visible | 500–1,500 | 4–15 |
| First four steps visible |  | 15–60 |
| All five steps visible |  | 60–90 |

The data in this chart were obtained with filtered gamma .02 A radiation.

Figure VI discloses a modified form of dosimeter which is designed to utilize both sides of casing 1.

To this end, the recess 2 of Figures I and II is replaced by a complete window opening 2a. The windows 13 and filters 14 are now located on the base plates 12 of Figures IV, V and VI. The window 3a is cut in casing 1 for viewing purposes. As in the previous modification, a gamma ray intensifier screen 5 is located in the opening 2a. There are then disposed on both sides of casing 1, in the order stated, a modulating wedge 6, film strips 8, and back plate 12, each having the construction of corresponding elements of the previous modification. The operation of this dosimeter is the same as that of the modification of Figures I and II, it being evident, however, that the latter modification provides greater latitude for indicating the presence and quantity of ionizing radiation.

Figures VII and VIII disclose a more compact dosimeter of the circular type but which utilize the essential elements of those of Figures I and II. This dosimeter is characterized by a circular casing 12, provided with a bottom wall 13 and side walls 14 having a recessed portion 15 of greater width than the opening of the container. The bottom wall 13 has a pie-shaped, cut-out portion 16 in which is located an orange filter 20, permitting viewing and post-exposure. An intensifying screen 5 of the type used in Figure I is located on the bottom wall 13 of the container. Overlying the intensifying screen is a circular wedge 6 bearing images of varying density. Both the modulating wedge 6 and the intensifying screen 5 are provided with cut-out, pie-shaped segments 21 and 22, respectively, matching the pie-shaped segment 16 in the container wall 13. In assembling the dosimeter, the cut-out portions in all three elements are arranged to overlie each other.

Reference numeral 8 designates the light sensitive photographic element bearing the high-speed emulsion 10. Said element is arranged with said emulsion side facing the bottom wall 13 of the container. The base 9 of the photographic element has secured thereto, by any suitable means, a button 17 which permits manual rotation of the photographic element 8. A cover plate 18, having a central aperture 19 to accommodate the button 17, is seated in the recess 15 in the container 12. Both the photographic element 8 and the cover plate 18 are circular and continuous.

The operation of this dosimeter is similar to that in Figure I. Thus, the ionizing radiation passes through the container 12 and, after intensification by the screen 5, is directed on the photographic element 8 through the modulating wedge 6. By rotating the photographic element to bring a selected area into viewing position through aperture 16 and filter 20, the degree of exposure may be ascertained in subdued light. Post-exposure may be effected in the same way and for the same purpose as with the devices of Figures I and VI through light directed into the dosimeter through aperture 16.

Preferably, as shown in Figure VIII, there is applied to the outer bottom wall of casing 13 along the aperture 16, a calibrated scale 22 of roentgen exposures. It is thus possible to secure a direct reading on the photosensitive element 8 of the characters of the five steps of the modulating wedge.

It is evident that with this dosimeter several dose evaluations may be attained without opening the dosimeter to replace the photosensitive element. Furthermore, the dosimeter is more compact. This dosimeter, therefore, represents our preferred modification.

Various modifications of the invention will occur to persons skilled in the art and we, therefore, do not intend to be limited in the patent granted except as necessitated by the appended claims.

We claim:

1. An apparatus for indicating the presence of ionizing radiation comprising a casing having a recess therein, a gamma ray intensifier screen positioned in said recess, a modulating step wedge disposed in contact with said screen, a light sensitive element bearing a high-speed, print-out emulsion arranged with its emulsion against said wedge, means for closing said casing and means permitting viewing of the emulsion of said light sensitive element.

2. An apparatus for indicating the presence of ionizing radiation comprising a container, a bottom wall of which has an aperture therein, a gamma ray intensifier screen located on said bottom wall, a modulating step wedge disposed in contact with said screen, said screen and modulating step wedge having apertures coinciding with the aperture in said container bottom wall, a light sensitive element bearing a high-speed, print-out emulsion arranged with the emulsion side facing said modulating step wedge, means for closing said container and means for rotating said light sensitive element to bring the various areas thereof over the coinciding apertures in said screen, step wedge and container bottom.

3. The apparatus as defined in claim 2, wherein the means for rotating said light sensitive element comprises a button fastened to said light sensitive element and projecting through the means for closing the container.

4. An apparatus for indicating the presence of ionizing radiation comprising a casing having recesses in the top and bottom portions thereof, a gamma ray intensifier screen located in one of said recesses, a modulating step wedge disposed in contact with said screen, a light sensitive element bearing a high-speed, print-out emulsion arranged with its emulsion against said wedge, means for closing said casing, said means having a window overlying said other recess to permit viewing of the emulsion of said light sensitive element.

5. The apparatus as defined in claim 4, wherein said light sensitive element is provided with a leader strip to provide for its movement from one recess to the other.

References Cited in the file of this patent

UNITED STATES PATENTS

| | | |
|---|---|---|
| 2,496,218 | Kieffer | Jan. 31, 1950 |
| 2,585,551 | Hofstadter | Feb. 12, 1952 |
| 2,664,511 | Moos | Dec. 29, 1953 |
| 2,689,308 | Land | Sept. 14, 1954 |

UNITED STATES PATENT OFFICE

CERTIFICATE OF CORRECTION

Patent No. 2,886,711 May 12, 1959

Henry T. Dybvig et al

It is hereby certified that error appears in the printed specification of the above numbered patent requiring correction and that the said Letters Patent should read as corrected below.

Column 1, line 29, for "speed" read -- speedy --; line 36, for "being" read -- bearing --.

Signed and sealed this 13th day of October 1959.

(SEAL)
Attest:
KARL H. AXLINE
Attesting Officer

ROBERT C. WATSON
Commissioner of Patents